United States Patent
Vivanco et al.

(10) Patent No.: US 9,060,293 B1
(45) Date of Patent: Jun. 16, 2015

(54) REDUCING WIRELESS COMMUNICATION SIGNALING OVERHEAD

(71) Applicant: Sprint Spectrum LP, Overland Park, KS (US)

(72) Inventors: Daniel Vivanco, Sterling, VA (US); Yu Zhou, Herndon, VA (US); Shahzada Rasool, Vienna, VA (US); Muhammad Naim, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 218 days.

(21) Appl. No.: 13/750,946

(22) Filed: Jan. 25, 2013

(51) Int. Cl.
*H04L 12/28* (2006.01)
*H04W 28/02* (2009.01)
*H04W 52/26* (2009.01)
*H04W 52/02* (2009.01)

(52) U.S. Cl.
CPC ........ *H04W 28/0231* (2013.01); *H04W 52/262* (2013.01); *H04W 28/0221* (2013.01); *H04W 52/0261* (2013.01)

(58) Field of Classification Search
CPC ................. H04W 28/0221; H04W 52/0261; H04W 52/262
USPC ......................... 370/311, 322, 400
See application file for complete search history.

(56) References Cited

U.S. PATENT DOCUMENTS

| | | | |
|---|---|---|---|
| 2007/0099577 A1* | 5/2007 | Lee et al. | 455/69 |
| 2010/0150082 A1 | 6/2010 | Shin et al. | |
| 2010/0172376 A1* | 7/2010 | Chun et al. | 370/474 |
| 2010/0214979 A1* | 8/2010 | Kuehnel et al. | 370/328 |
| 2013/0135996 A1* | 5/2013 | Torres et al. | 370/230 |

* cited by examiner

*Primary Examiner* — Redentor Pasia
*Assistant Examiner* — Salvadore E Rivas

(57) ABSTRACT

In systems and methods of reducing wireless communication signaling overhead, it is determined that communication resource request traffic from a plurality of wireless devices in communication with an access node to communicate with a communication network meets a first threshold. One of the plurality of wireless devices is selected to operate as a router wireless device based on a power storage level and an assigned modulation and coding scheme of each of the plurality of wireless devices. At least one of the unselected wireless devices is instructed to communicate with the communication network via the selected router wireless device.

12 Claims, 6 Drawing Sheets

REDUCING WIRELESS COMMUNICATION SIGNALING OVERHEAD

TECHNICAL BACKGROUND

A wireless device attempting to establish communication with a wireless communication network typically sends a communication resource request, such as a request for a communication channel, to an access node. The access node typically uses a procedure to allocate wireless communication link resources to the requesting wireless device, such as a random access procedure, which allocates communication link resources on a request or need basis rather than establishing dedicated wireless link resources for the wireless device. A random access procedure can be used in a variety of circumstances, such as when a wireless device initiates communication when it comes out of a lower power or idle state, when a wireless device is attempting to re-establish a lost or temporarily dropped connection, when the wireless device is handed over to a second access node, or when data is available to be transferred between the access node and the wireless device.

Overview

In operation, it is determined that communication resource request traffic from a plurality of wireless devices in communication with an access node to communicate with a communication network meets a first threshold. One of the plurality of wireless devices is selected to operate as a router wireless device based on a power storage level and an assigned modulation and coding scheme of each of the plurality of wireless devices. At least one of the unselected wireless devices is instructed to communicate with the communication network via the selected router wireless device.

DETAILED DESCRIPTION

Figure 1:
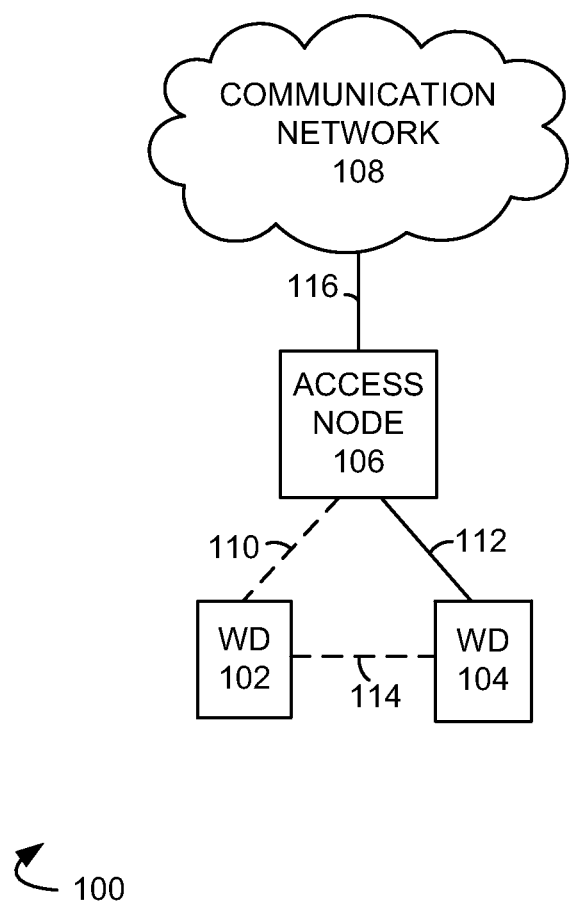
FIG. 1 illustrates an exemplary communication system to reduce wireless communication overhead.

FIG. 1 illustrates an exemplary communication system 100 to reduce wireless communication overhead comprising wireless devices 102 and 104, access node 106, communication network 108. Examples of wireless devices 102 and 104 can comprise a cell phone, a smart phone, a computing platform such as a laptop, palmtop, or tablet, a personal digital assistant, or an internet access device, including combinations thereof. Wireless device 102 can communicate with access node 106 over communication link 110, and wireless device 104 can communicate with access node 106 over communication link 112. Wireless devices 102 and 104 can also communicate with each other over communication link 114.

Access node 106 is a network node capable of providing wireless communications to wireless devices 102 and 104, and can be, for example, a base transceiver station, a radio base station, an eNodeB device, or an enhanced eNodeB device. Access node 106 is in communication with communication network 108 over communication link 116.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying data, for example, to support voice and data communications by a wireless device such as wireless devices 102 and 104. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise additional base stations, controller nodes, telephony switches, internet routers, network gateways, computer systems, communication links, or some other type of communication equipment, and combinations thereof.

Communication links 110, 112, 114, and 116 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 106 and communication network 108 which are omitted for clarity, including additional processing nodes, routers, gateways, and physical and/or wireless data links for carrying data among the various network elements.

In operation, it is determined that communication resource request traffic from a plurality of wireless devices 102 and 104 in communication with access node 106 to communicate with a communication network meets a first threshold. One of the plurality of wireless devices, for example, wireless device 104, is selected to operate as a router wireless device based on a power storage level and an assigned modulation and coding scheme of each of wireless devices 102 and 104. At least one of the unselected wireless devices, such as wireless device 102, is instructed to communicate with the communication network via selected router wireless device 104.

Figure 2:
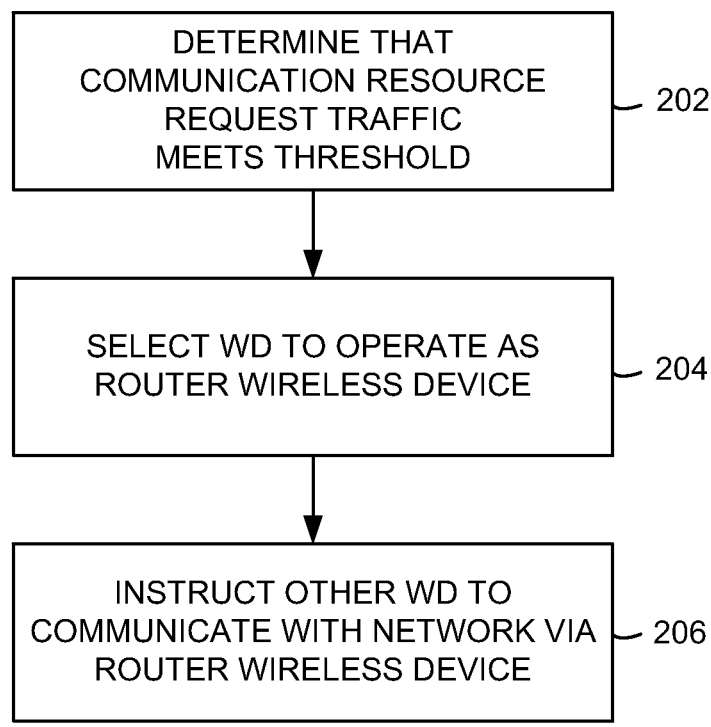
FIG. 2 illustrates an exemplary method of reducing wireless communication overhead.

FIG. 2 illustrates an exemplary method of reducing wireless communication overhead. In operation 202, it is determined that buffer status report traffic from a plurality of wireless devices in communication with an access node to communicate with a communication network meets a first threshold.

A wireless device attempting to establish communication with a wireless communication network typically sends a communication resource request to an access node. As an example, a wireless device can send a request for a communication channel to an access node. One example of a communication resource request is a buffer status report (BSR). A communication resource request can indicate an amount of data to be transmitted. For example, wireless devices 102 and 104 can each send a communication resource request to access node 106 requesting communication resources to transmit data buffered at each wireless device. In addition to information indicating an amount of data to be transmitted, the request for communication resources can also comprise an indication of what type of data is to be transmitted, such as logical channel group (LCG) or similar information. A scheduling function of the access node can assign communication resources based on, among other things, the received BSR, the LCG information, and conditions of the communication link with the wireless devices. The access node can then notify the wireless device of resources allocated to the wireless device, and the wireless device can acknowledge the allocation and transmit the buffered data.

A wireless device may request communication resources for different types of data, for example, video data, voice data, data for email and other messaging, and the like. A wireless device can group requests based on a logical channel group or similar information in a combined communication resource request. A communication resource request can comprise a variety of formats. For example, in the case of a buffer status report, a short BSR format can comprise, for example, a radio bearer group identifier and a corresponding buffer size, and a long BSR format can comprise, for example, a plurality of buffer size fields and their corresponding radio bearer group identifiers. Other formats are also possible.

As a number of requests for communication resources received by an access node increases, the signaling overhead in communication links of the wireless device, such as communication links 110 and 112, can increase. Excessive communication link overhead can lead to a degradation in communication link quality, and thus a decrease in a quality of service provided by the access node. The degradation in service can be experienced in both an uplink and a downlink portion of a communication link, at least because communication resource requests are acknowledged by the access node and followed or accompanied by a resource allocation message. Accordingly, in operation 202, it is determined that communication resource request traffic from a plurality of wireless devices in communication with an access node to communicate with a communication network meets a first threshold.

In operation 204, one of the plurality of wireless devices is selected to operate as a router wireless device based on a power storage level and an assigned modulation and coding scheme (MCS) of each of the plurality of wireless devices. For example, access node 106 can determine a power storage level (such as a battery level) of each of wireless devices 102 and 104, and can also determine a modulation and coding scheme assigned to communication links 110 and 112. As one example, where wireless device 104 has a greater power storage level than wireless device 102, and/or where communication link 112 is assigned an MCS permitted a greater data rate than communication link 110, access node 106 can select wireless device 104 to operate as a router wireless device. When access node 106 selects wireless device 104 to operate as a router wireless device, access node 106 can notify selected wireless device 104, and further can instruct wireless device 104 to send and receive communications with other wireless devices.

In operation 206, at least one of the unselected wireless devices is instructed to communicate with the communication network via the selected router wireless device. For example, when access node 106 instructs wireless device 104 to operate as a router wireless device, access node 106 can also notify at least one other wireless device in communication with access node 106, such as wireless device 102. In an embodiment, when wireless device 104 is selected to operate as a router wireless device, access node 106 can instruct wireless device 104 to send and receive communications with other wireless devices, and further, access node 106 can instruct wireless device 102 to communicate with wireless device 104 over communication link 114. Moreover, access node 106 can instruct wireless device 102 to communicate with access node 106 via wireless device 104. While wireless device 102 is in communication with communication system 100 via wireless device 104, access node 106 will typically not receive a request for communication resources from wireless device 102. Further, while wireless device 102 is in communication with communication system 100 via wireless device 104, access node 106 will typically receive a communication resource request from wireless device 104 which includes a request for communication resources required by wireless devices 102 and 104. Thus, the communication resource request received from wireless device 104 can comprise a combined or aggregated resource request.

Figure 3:
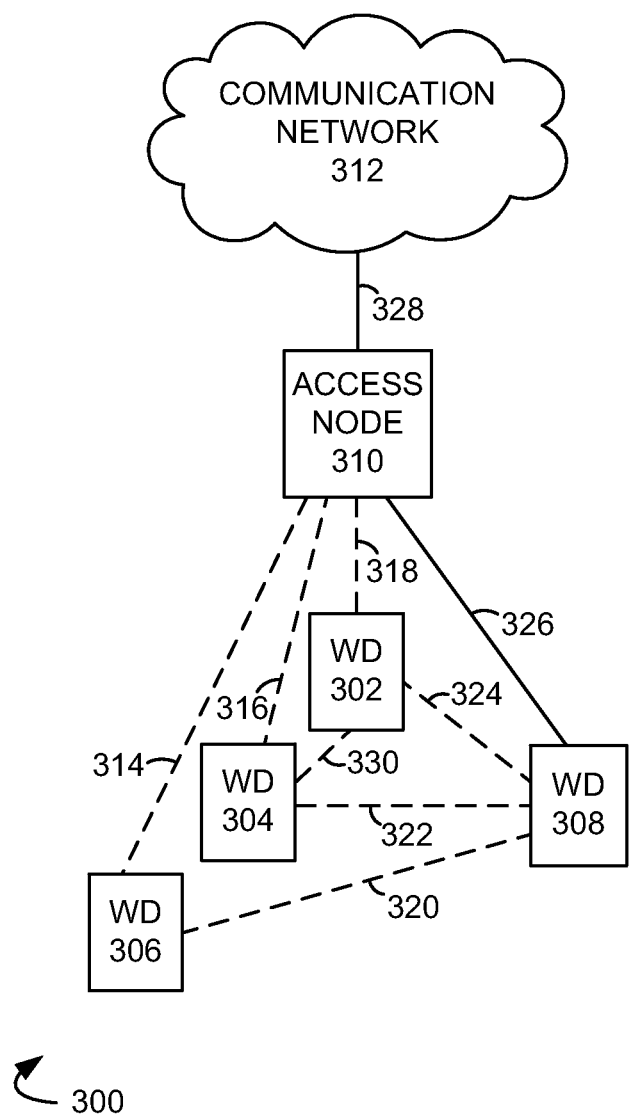
FIG. 3 illustrates another exemplary communication system to reduce wireless communication overhead.

FIG. 3 illustrates another exemplary communication system 300 to reduce wireless communication overhead comprising wireless devices 302, 304, 306 and 308, access node 310, and communication network 312. Examples of wireless devices 302, 304, 306 and 308 can comprise a cell phone, a smart phone, a computing platform such as a laptop, palmtop, or tablet, a personal digital assistant, or an internet access device, including combinations thereof. Wireless device 302 can communicate with access node 310 over communication link 318 and with wireless device 308 over communication link 324. Wireless device 304 can communicate with access node 310 over communication link 316 and with wireless device 308 over communication link 322. Wireless device 304 can also communicate with wireless device 302 over communication link 330. Wireless device 306 can communicate with access node 310 over communication link 314 and with wireless device 308 over communication link 320. Wireless device 308 can also communicate with access node 310 over communication link 326.

Access node 310 is a network node capable of providing wireless communications to wireless devices 302, 304, 306 and 308, and can be, for example, a base transceiver station, a radio base station, an eNodeB device, or an enhanced eNodeB device. Access node 310 is in communication with communication network 312 over communication link 328.

Communication network 312 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 312 can be capable of carrying data, for example, to support voice and data communications by a wireless device such as wireless devices 302, 304, 306 and 308. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 312 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 312 may also comprise additional base stations, controller nodes, telephony switches, internet routers, network gateways, computer systems, communication links, or some other type of communication equipment, and combinations thereof.

Communication links 314, 316, 318, 320, 322, 324, 326, 328 and 330 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used, including combinations thereof. For example, wireless devices can communicate with access node 310 using a first communication protocol or radio access technology, and can communicate with a selected router wireless device using a second communication protocol or radio access technology. In an embodiment, wireless devices can communication with a selected router wireless device using a short range communication protocol, such as those described in the IEEE 802 family of specifications, which includes WiFi, Bluetooth, ZigBee, and others.

Other network elements may be present in the communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 310 and communication network 312 which are omitted for clarity, including additional processing nodes, routers, gateways, and physical and/or wireless data links for carrying data among the various network elements.

Figure 4:
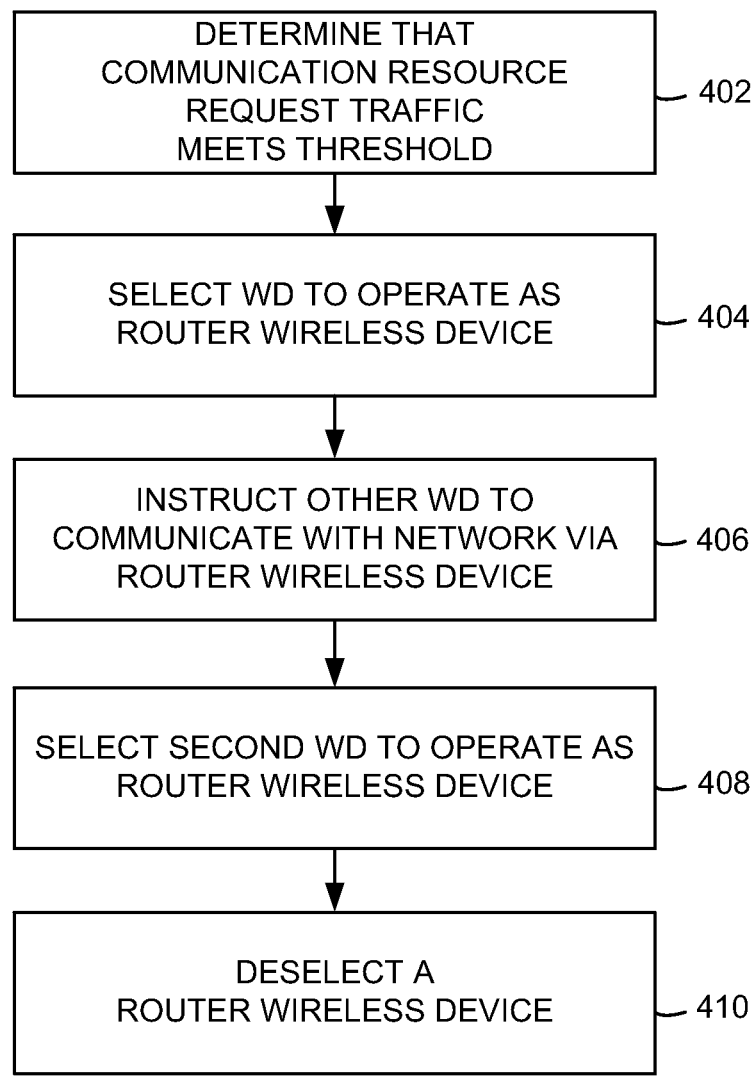
FIG. 4 illustrates another exemplary method of reducing wireless communication overhead.

FIG. 4 illustrates another exemplary method of reducing wireless communication overhead. In operation 402, it is determined that buffer status report traffic from a plurality of wireless devices in communication with an access node to communicate with a communication network meets a first threshold. As a number of requests for communication resources received by an access node increases, the signaling overhead in communication links of the wireless device, such as communication links 314, 316, 318, and 326, can increase. Excessive communication link overhead can lead to a degradation in communication link quality, and thus a decrease in a quality of service provided by the access node. The degradation in service can be experienced in both an uplink and a downlink portion of a communication link, at least because communication resource requests are acknowledged by the access node and followed or accompanied by a resource allocation message. Accordingly, in operation 402, it is determined that buffer status report traffic from a plurality of wireless devices in communication with an access node to communicate with a communication network meets a first threshold.

In operation 404, one of the plurality of wireless devices is selected to operate as a router wireless device based on a power storage level and an assigned modulation and coding scheme (MCS) of each of the plurality of wireless devices. For example, access node 310 determine a power storage level (such as a battery level) of each of wireless devices 302, 304, 306 and 308, and can also determine a modulation and coding scheme assigned to communication links 314, 316, 318, and 326. As one example, where wireless device 308 has a greater power storage level than wireless devices 302, 304 and 306, and/or where communication link 326 is assigned an MCS permitted a greater data rate and/or error correction than communication links 314, 316 and 318 access node 310 can select wireless device 308 to operate as a router wireless device. When access node 310 selects wireless device 308 to operate as a router wireless device, access node 310 can notify selected wireless device 308, and further can instruct wireless device 308 to send and receive communications with other wireless devices.

In an embodiment, the one of the plurality of wireless devices can also be selected based on a number of streams of data the wireless device is capable of receiving. For example, a wireless device can comprise more than one transceiver to send and/or receive more than one transmission, data stream, etc. during a time period. A wireless device which is capable of receiving two or more data streams can be selected from the plurality of wireless devices. In an embodiment, the one of the plurality of wireless devices can be selected to operate as the router wireless device based on a power storage level, an assigned modulation and coding scheme, and a capability to receive a number of data streams of each wireless device.

In operation 406, at least one of the unselected wireless devices is instructed to communicate with the communication network via the selected router wireless device. For example, when access node 310 instructs wireless device 308 to operate as a router wireless device, access node 310 can also notify at least one other wireless device in communication with access node 310, such as wireless devices 302, 304 and 306. In an embodiment, when wireless device 308 is selected to operate as a router wireless device, access node 310 can instruct wireless devices 302, 304 and 306 to send and receive communications with other wireless devices, and further, access node 310 can instruct wireless devices 302, 304 and 306 to communicate with wireless device 308 over communication links 324, 322 and 320, respectively. Moreover, access node 310 can instruct wireless devices 302, 304 and 306 to communicate with access node 310 via wireless device 308. While wireless devices 302, 304 and 306 are in communication with communication system 300 via wireless device 308, access node 310 will typically not receive a request for communication resources from wireless devices 302, 304 and 306. Further, a request for communication resources received by access node 310 from wireless device 308 can comprise an aggregated request for communication resources, which can include resource requests from at least one of wireless devices 302, 304 and 306.

In an embodiment, an application requirement and/or a service quality requirement of the unselected wireless devices can be considered when instructing the unselected wireless devices whether to communicate with the communication network via the router wireless device. For example, where wireless device 306 is an unselected wireless device and wireless device 308 is selected to operate as a router wireless device, wireless device 306 can be running, for example, an application which requires a minimum data rate, or a maximum data delay, or a maximum error rate, and the like. Examples of such an application include a voice application (such as a voice over internet protocol application), a streaming video application, and a streaming audio application. Similarly, wireless device 306 may comprise a service quality requirement, which can be based on a requirement of the type of application running on wireless device 306, or it can be based on a service level or service quality requirement associated with wireless device 306 in communication network 312. While wireless device 306 is capable of communicating with wireless device 308 over communication link 320, the ability of wireless device 308 can be evaluated, for example, against a threshold level of an application requirement and/or a service level requirement associated with wireless device 306. In an embodiment, at least one of the unselected wireless devices can be instructed to communicate with the communication network via the selected router wireless device based on at least one of an application requirement and a service quality requirement of the at least one of the unselected wireless devices.

In an embodiment, at least one of the unselected wireless devices can be instructed to communicate with the communication network via the selected router wireless device when an assigned modulation and coding scheme (MCS) of the selected wireless device is greater than or equal to an assigned modulation and coding scheme of the at least one of the unselected wireless devices. For example, an MCS assigned to communication link 326 can greater than or equal to an MCS assigned to communication link 314. The comparison of the MCS associated with communication links 314 and 326 can be based on, for example, an achievable data rate or throughput, a data delay, an error rate, and the like, of each communication link.

In an embodiment, at least one of the unselected wireless devices can be instructed to communicate with the communication network via the selected router wireless device when the selected wireless device is capable of receiving at least a same number of data streams as the at least one of the unselected wireless devices. For example, wireless device 306 may be capable of receiving two data streams. Where wireless device 308 is capable of receiving two or more data streams, wireless device 308 can be selected to operate as a router wireless device, and wireless device 306 can be instructed to communicate with communication network 312 via wireless device 308.

Other criteria can be used when instructing an unselected wireless device to communicate with the communication network via a selected router wireless device, including combinations of the foregoing.

In operation 408, a second one of the plurality of wireless devices is selected to operate as a router wireless device when an aggregated communication resource request traffic from the selected router wireless device meets the first threshold. For example, a demand for communication resources from wireless devices 302, 304, 306 and 308 can be combined into an aggregated communication resource request, which can be generated and sent from wireless device 308 (operating as a router wireless device) to access node 310. At least one of wireless devices 302, 304, and 306 can change an application running on the wireless device, or can request a service or a download of data, or in some other way can increase its requirement for communication resources. The aggregated communication resource request can thus increase meet the first threshold. When the aggregated communication resource request traffic from the selected router wireless device meets the first threshold. a second one of the plurality of wireless devices can be selected to operate as a router wireless device. For example, wireless device 302 can be selected to operate as a second router wireless devices. Wireless device 302 can be selected based on any of the criteria described above, including combinations thereof. Further, an unselected wireless device can be instructed to communicate with the communication network via the second selected router wireless device. For example, wireless device 304 can be instructed to communicate with wireless device 302 over communication link 330.

In an embodiment, an uplink packet delay of the unselected wireless devices can be measured, and when an uplink packet delay meets a threshold, a second wireless device can be selected to operate as a router wireless device. For example, wireless devices 302, 304 and 306 can be instructed to communicate with wireless device 308 operating as a router wireless device. Data communicated between wireless devices 302, 304 and 306 and access node 310 via wireless device 308 can comprise an identifier of wireless device 302, 304 and 306, respectively. A delay of data packets from each of wireless devices 302, 304, 306 and 308 can be measured, and when a packet delay from any of wireless devices 302, 304, 306 and 308 meets a delay threshold, a second wireless device (for example, wireless device 302) can be selected to operate as a router wireless device. Criteria used to select wireless device 302 can comprise one or more combinations of criteria described above, including combinations thereof. In an embodiment, a second one of the plurality of wireless device can be selected to operate as a router wireless device when an uplink packet delay meets a second threshold and an when communication resource request traffic from the selected router wireless device meets the first threshold.

In operation 410, one of the plurality of wireless devices can be deselected from operating as the router wireless device based on at least one of a power storage level, a wireless device mobility, and channel conditions of a communication link of the selected one of the plurality of wireless devices. For example, wireless device 308 can move out of a coverage area of access node 310, or it can move out of range of one of communication links 324, 322 and/or 320. As another example, a delay time of packets received from wireless devices 302, 304 and/or 306 can meet a delay threshold, and based on the delay meeting the delay threshold, a router wireless device can be deselected. As another example, channel conditions of communication link 326, or of communication links 324, 322 or 320, can change such that wireless device 308 cannot satisfy the requirements of one of wireless devices 302, 304 and/or 306. The change can be, for example, a decrease in received signal strength, received signal quality, data throughput, a change in an assigned MCS (comprising either encoding or error correction), and so forth. As another example, a power storage level of wireless device 308 can decrease to meet a threshold. Based on at least one of a power storage level, a wireless device mobility, and channel conditions of a communication link of the selected one of the plurality of wireless devices, wireless device 308 can be deselected as a router wireless device. When wireless device 308 is deselected, other wireless devices in communication with access node 310 through wireless device 308 can be instructed to communicate with another wireless device (for example, second router wireless device 302) or to communicate with access node 310 without the involvement of another wireless device.

Figure 5:
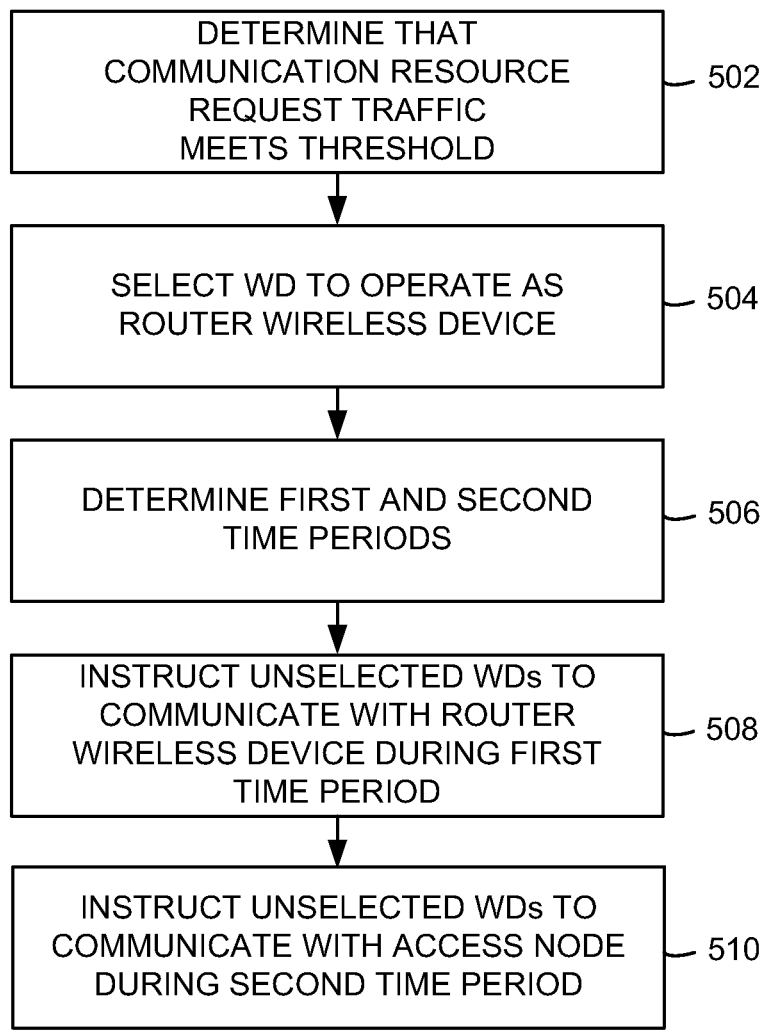
FIG. 5 illustrates another exemplary method of reducing wireless communication overhead.

FIG. 5 illustrates another exemplary method of reducing wireless communication overhead. In operation 502, it is determined that communication resource request traffic from a plurality of wireless devices in communication with an access node to communicate with a communication network meets a first threshold. As a number of requests for communication resources received by an access node increases, the signaling overhead in communication links of the wireless device, such as communication links 314, 316, 318, and 326, can increase, and can lead to a degradation in communication link quality, and thus a decrease in a quality of service provided by the access node. Accordingly, in operation 502, it is determined that communication resource request traffic from a plurality of wireless devices in communication with an access node to communicate with a communication network meets a first threshold.

In operation 504, one of the plurality of wireless devices is selected to operate as a router wireless device based on a power storage level and an assigned modulation and coding scheme (MCS) of each of the plurality of wireless devices. For example, access node 310 determine a power storage level (such as a battery level) of each of wireless devices 302, 304, 306 and 308, and can also determine a modulation and coding scheme assigned to communication links 314, 316, 318, and 326. As one example, where wireless device 308 has a greater power storage level than wireless devices 302, 304 and 306, and/or where communication link 326 is assigned an MCS permitted a greater data rate and/or error correction than communication links 314, 316 and 318 access node 310 can select wireless device 308 to operate as a router wireless device. When access node 310 selects wireless device 308 to operate as a router wireless device, access node 310 can notify selected wireless device 308, and further can instruct wireless device 308 to send and receive communications with other wireless devices.

In operation 506, a first time period and a second time period can be determined and can be assigned to each unselected wireless device. The first time period and second time period assigned to each unselected wireless device can be different. In an embodiment, the first and second time periods can be used to determine which unselected wireless devices can communicate with the selected router wireless device. For example, wireless device 308 may be unable to support communications with all of wireless devices 302, 304 and 306 substantially simultaneously. The first and second time periods can therefore initially be randomly selected, for example, to mitigate a number of wireless devices requesting communication with either a router wireless device or the access node at substantially the same time.

Unselected wireless devices are instructed to communicate with the communication network via the selected router wireless device during the first time period (operation 508), and unselected wireless devices are instructed to communicate with the communication network via the access node during the second time period (operation 510). In an embodiment, unselected wireless devices can communicate with access node 310 using a first communication protocol or radio access technology, and can communicate with wireless device 308 as a router wireless device using a second communication protocol or radio access technology. For example, wireless devices 302, 304, 306 and 308 can use LTE, WiMAX, CDMA, and the like to communicate with access node 310, and further, wireless devices 302, 304 and 306 can use WiFi, Bluetooth, Zigbee, and the like to communicate with wireless device 308. In an embodiment, during the first time period (when wireless devices 302, 304 and/or 306 communicate with wireless device 308 as a router wireless device), wireless devices 302, 304 and/or 306 can turn off radio which uses the first communication protocol or radio access technology. In an embodiment, during the second time period (when wireless device 302, 304 and/or 306 communicate with access node 310), wireless devices 302, 304 and/or can turn off a radio which uses the second communication protocol or radio access technology.

Further, the first and second time periods can be adjusted periodically. For example, uplink and downlink delay determinations can be made, which can be based on data sent between access mode 310 and wireless devices. When an uplink delay and/or a downlink delay meets a delay threshold, a first time period and/or a second time period of a wireless device can be adjusted. For example, wireless device 302 can be in communication with wireless device 308 as a router wireless device over communication link 324, and it can be determined that data sent to and/or from wireless device 302 meets a delay threshold. The delay threshold can comprise a maximum permitted delay for an application running on wireless device 302, or a minimum data rate of the application, or a maximum error rate, and the like. When the delay for wireless device 302 meets the delay threshold, the first time period can be shortened, and/or the second time period can be lengthened.

In an embodiment, a delay time can be added to the second time period of one of the unselected wireless devices when the selected router wireless device cannot meet a quality of service requirement of the one of the unselected wireless devices. For example, wireless device 302 can be assigned a first time period in which wireless device 302 communicates with wireless device 308 as a router wireless device over communication link 324, and a second time period in which wireless device 302 communicates with access node 310 over communication link 318. When wireless device 308 is unable to meet a quality of service requirement of wireless device 302, a delay time can be added to the second time period of wireless device 302, to lengthen the second time period during which wireless device 302 communicates with access node 310 over communication link 318.

In an embodiment, a second delay time can be added before the first time period for each of the unselected wireless devices. For example, if wireless devices 302, 304 and 306 each attempt to communicate with wireless device 308 at substantially the same time, wireless device 308 can be overloaded quickly. A delay time can be added before the first time period of each of wireless devices 302, 304 and 306 so that each unselected wireless device attempts to communicate with the router wireless device at a different time. In an embodiment, the delay time added before each first time period can be a randomly determined time period.

A delay time can be added to the first and/or the second time period based on a loading of the access node, or of a router wireless device. For example, if a loading of access node 310 meets a threshold, a delay time can be added to the first time period of at least one unselected wireless device to lengthen the period of time in which unselected wireless devices communicate with the selected router wireless device. Similarly, the second time period of at least one unselected wireless device can be shortened, to decrease the period of time in which the unselected wireless device communicates directly with access node 310. The first and/or second time period of a wireless device can be adjusted based on, for example, a type of application running on the wireless device, or an amount of data sent, received, or requested by the wireless device, and the like.

A delay time can also be added to the first and/or the second time period based on a required service level associated with each wireless device. The service level can be associated with each wireless device in communication network 300. The service level can also be based on a type of traffic or data sent to, received from, or requested by each wireless device. In an embodiment, an uplink quality of service level can be mapped by each wireless device to a radio bearer group to provide service level information to communication system 300. Service level information required for a data or traffic type can also be determined based on the data or traffic itself, for example, by deep packet inspection of data to or from each wireless device.

A delay time can also be added to the first and/or the second time period to prevent a disruption in a service provided to a wireless device. For example, it can be determined that wireless device 304 is receiving a data stream comprising a video stream, or an audio stream, or a file download. Access node 310, or wireless device 308 operating as a router wireless device, can determine that wireless device 304 is receiving the data stream, and a delay time can be added to, for example, to the first time period to lengthen the period of time in which wireless device 304 communicates with wireless device 308, or to the second time period to lengthen the period of time in which wireless device 304 communicates with access node 310 over communication link 316.

In operation 508, a second one of the plurality of wireless devices is selected to operate as a router wireless device when an aggregated communication resource request traffic from the selected router wireless device meets the first threshold. For example, a demand for communication resources from wireless devices 302, 304, 306 and 308 can be combined into an aggregated communication resource request, which can be generated and sent from wireless device 308 (operating as a router wireless device) to access node 310. At least one of wireless devices 302, 304, and 306 can change an application running on the wireless device, or can request a service or a download of data, or in some other way can increase its requirement for communication resources. The aggregated communication resource request can thus increase meet the first threshold. When the aggregated communication resource request traffic from the selected router wireless device meets the first threshold. a second one of the plurality of wireless devices can be selected to operate as a router wireless device. For example, wireless device 302 can be selected to operate as a second router wireless devices. Wireless device 302 can be selected based on any of the criteria described above, including combinations thereof. Further, an unselected wireless device can be instructed to communicate with the communication network via the second selected router wireless device. For example, wireless device 304 can be instructed to communicate with wireless device 302 over communication link 330.

Figure 6:
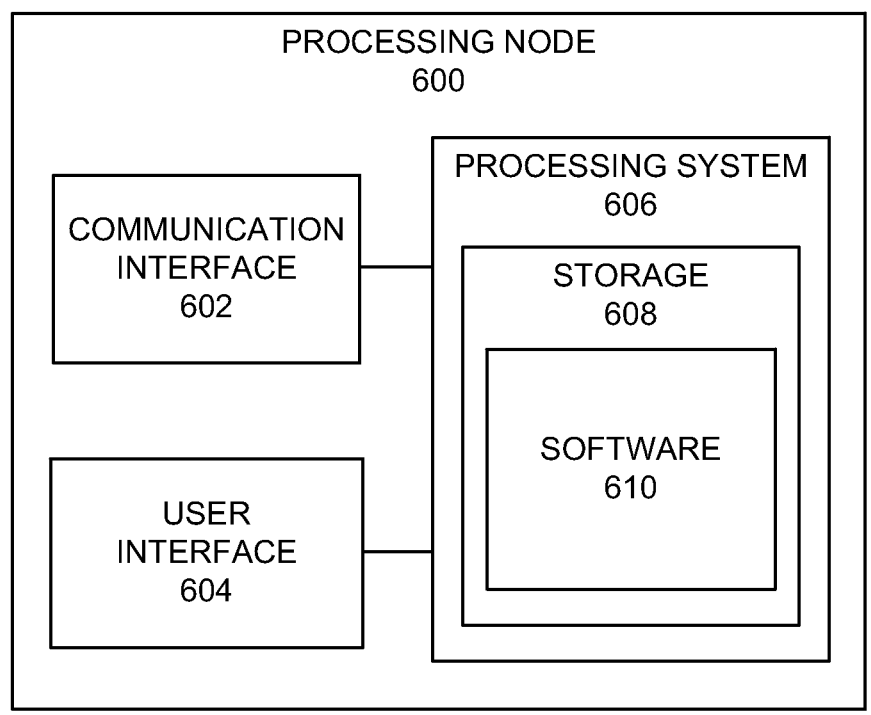
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include proxy node 308 and gateway 310. Processing node can also be an adjunct or component of a network element, such as an element of access node 106 or access node 306. Processing node 600 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of reducing wireless communication overhead, comprising:
   receiving, at an access node, communication resource requests from a plurality of connected wireless devices to communicate over a communication network;
   determining that traffic generated by the communication resource requests meets a buffer status reporting threshold;
   determining a power storage level of each wireless device in the plurality of connected wireless devices and an associated modulation and coding scheme (MCS) assigned to communication links assigned to each of the plurality of connected wireless devices;
   selecting, based on the determined power storage level and associated MCS, at least one wireless device to operate as a router wireless device; and
   instructing an unselected wireless device to communicate with the communication network via the selected router wireless device when the MCS of the communication link assigned to the selected wireless device is greater than or equal to the MCS of the communication link assigned to the unselected wireless device.

2. The method of claim 1, wherein selecting the router wireless device further comprises selecting the at least one wireless device from the plurality of connected wireless devices having a capability to receive multiple data streams.

3. The method of claim 1, further comprising:
selecting the unselected wireless device from the plurality of connected wireless devices based on at least one of an application requirement and a service quality requirement of an application running on the unselected wireless device; and
instructing the unselected wireless device to communicate with the communication network via the selected router wireless device.

4. The method of claim 1, further comprising:
instructing the unselected wireless device to communicate with the communication network via the selected router wireless device when the selected router wireless device is capable of receiving at least a same number of data streams as being sent by the unselected wireless device.

5. The method of claim 1, further comprising:
selecting a second wireless device from the plurality of connected wireless devices to operate as a second router wireless device when an aggregated buffer status report traffic from the selected router wireless device meets the buffer status reporting threshold.

6. The method of claim 1, further comprising:
deselecting at least one of the selected router wireless devices based on at least one of the power storage level, a wireless device mobility, and channel conditions of the communication link assigned to the selected wireless device.

7. A system for reducing wireless communication overhead, comprising:
a processing node configured to
receive, at an access node, communication resource requests from a plurality of connected wireless devices to communicate over a communication network;
determine that traffic generated by the communication resource requests meets a buffer status reporting threshold;
determine a power storage level of each wireless device in the plurality of connected wireless devices and an associated modulation and coding scheme (MCS) assigned to communication links assigned to each of the plurality of connected wireless devices;
select, based on the determined power storage level and associated MCS, at least one wireless device to operate as a router wireless device; and
instruct an unselected wireless device to communicate with the communication network via the selected router wireless device when the MCS of the communication link assigned to the selected wireless device is greater than or equal to the MCS of the communication link assigned to the unselected wireless device.

8. The system of claim 7, wherein the processing node is further configured to:
select the router wireless device from the plurality of connected wireless devices having a capability to receive multiple a data streams.

9. The system of claim 7, wherein the processing node is further configured to:
select the unselected wireless device from the plurality of connected wireless devices based on at least one of an application requirement and a service quality requirement of an application running on the unselected wireless device; and
instruct the unselected wireless device to communicate with the communication network via the selected router wireless device.

10. The system of claim 7, wherein the processing node is further configured to:
instruct the unselected wireless device to communicate with the communication network via the selected router wireless device when the selected router wireless device is capable of receiving at least a same number of data streams as being sent by the one unselected wireless devices.

11. The system of claim 7, wherein the processing node is further configured to:
select a second wireless device from the plurality of connected wireless devices to operate as a second router wireless device when an aggregated buffer status report traffic from the selected router wireless device meets the buffer status reporting threshold.

12. The system of claim 7, wherein the processing node is further configured to:
deselect at least one of the selected router wireless devices based on at least one of the power storage level, a wireless device mobility, and channel conditions of the communication link assigned to the selected wireless device.

* * * * *